United States Patent [19]
Takahashi et al.

[11] Patent Number: 5,336,527
[45] Date of Patent: Aug. 9, 1994

[54] METHOD OF COVERING SUBSTRATE SURFACE WITH SINTERED LAYER AND POWDERY RAW MATERIAL USED FOR THE METHOD

[75] Inventors: Sakae Takahashi, Mishima; Minoru Umehara, Numazu, both of Japan

[73] Assignee: Toshiba Machine Co., Ltd., Tokyo, Japan

[21] Appl. No.: 797,952

[22] Filed: Nov. 26, 1991

[30] Foreign Application Priority Data

Nov. 30, 1990 [JP] Japan .................. 2-338635

[51] Int. Cl.⁵ .............................. B05D 3/12
[52] U.S. Cl. .................. 427/357; 264/125; 419/8
[58] Field of Search .......... 427/357, 190, 191; 75/225

[56] References Cited

U.S. PATENT DOCUMENTS

| | | | |
|---|---|---|---|
| 3,475,161 | 10/1969 | Ramirez et al. | 427/357 |
| 4,039,700 | 8/1977 | Sohmer et al. | 427/191 |
| 4,102,678 | 7/1978 | Gothard et al. | 427/357 |
| 4,750,667 | 6/1988 | Takahashi et al. | 427/357 |
| 4,851,267 | 7/1989 | Miyauchi et al. | 427/357 |

FOREIGN PATENT DOCUMENTS

| | | |
|---|---|---|
| 2954305 | 10/1985 | Fed. Rep. of Germany . |
| 62-151581 | 7/1987 | Japan . |
| 62-197264 | 8/1987 | Japan . |
| 2213455 | 8/1990 | Japan . |

*Primary Examiner*—Scott Kastler
*Attorney, Agent, or Firm*—Cushman, Darby & Cushman

[57] ABSTRACT

A method of covering a substrate surface with a sintered layer comprises the step of loading a powdery raw material in a region of forming a sintered layer on the surface of a substrate, and the step of sintering the loaded powdery raw material so as to form a sintered layer on the surface of the substrate. The powdery raw material contains at least two elements and has a temperature region in which a solid phase and a liquid phase are present together. The liquid phase is wettable with the substrate. The sintering step is performed within a temperature region in which the solid phase and the liquid phase of the powdery raw material are present together.

13 Claims, 9 Drawing Sheets

FIG. 3C (ASSEMBLING)
(LOADING)

FIG. 3A (AFTER MECHANICAL PROCESSING)

FIG. 7A (ASSEMBLING) (LOADING 1)

FIG. 7B (SUBSTRATE SETTING) (LOADING 2)

FIG. 7C (AFTER SINTERING)

FIG. 7D (AFTER MECHANICAL PROCESSING)

F I G. 11

METHOD OF COVERING SUBSTRATE SURFACE WITH SINTERED LAYER AND POWDERY RAW MATERIAL USED FOR THE METHOD

BACKGROUND OF THE INVENTION

1. Field of the Invention

The present invention relates to a method of covering a substrate surface with a sintered layer, particularly to a method of covering the surface of a steel material with a sintered layer exhibiting a high corrosion resistance and a high abrasion resistance.

2. Description of the Related Art

Figure 9:
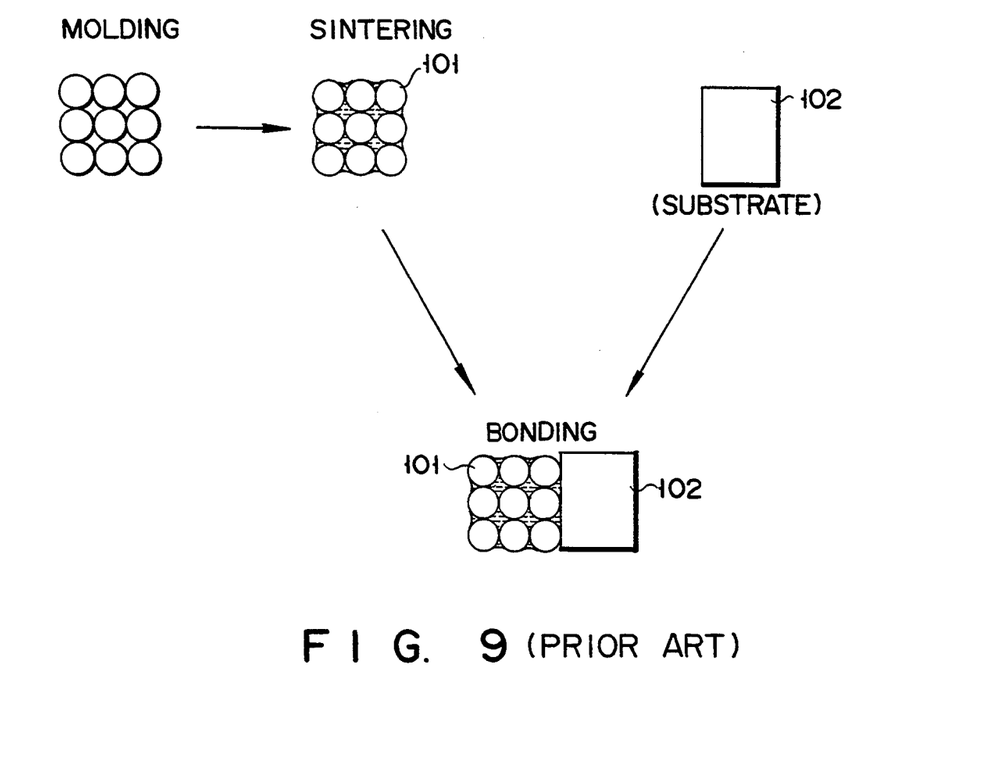
FIGS. 9 and 10 show conventional methods.
Figure 10:
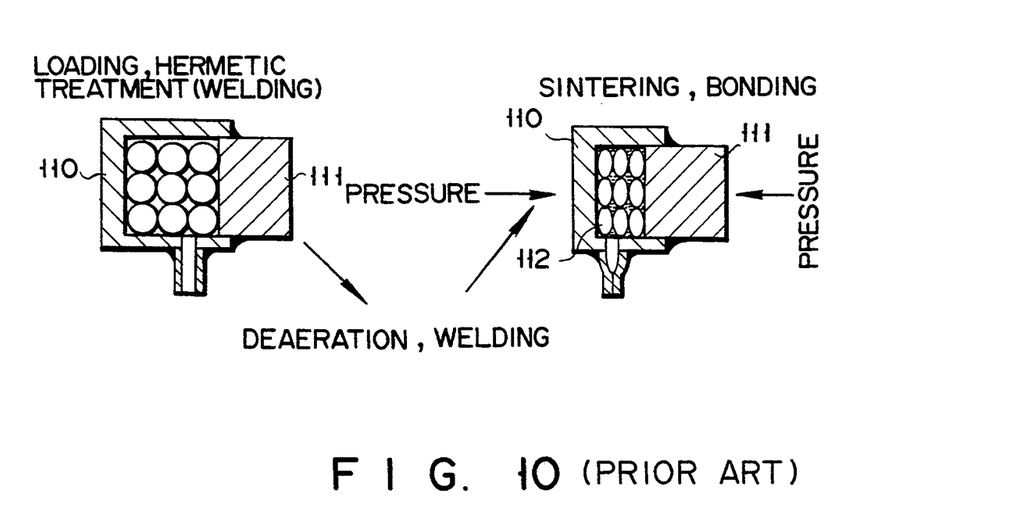

FIGS. 9 and 10 show conventional methods of covering a substrate surface with a sintered body. In the art shown in FIG. 9, a sintered body 101 prepared by sintering a molded material is bonded to a substrate 102. On the other hand, the art shown in FIG. 10 utilizes a hot isostatic pressing (HIP) which comprises a hermetic welding step applied to a raw material powder loaded in a space defined by a vessel 110 and a substrate 111, and a deaeration step in preparation for the subsequent bonding step which is carried out by means of sintering under pressure so as to cover the substrate 111 with a sintered layer 112.

However, the art shown in FIG. 9 necessitates two heating steps, i.e., the sintering step and the bonding step, leading to a high manufacturing cost. In addition, a precision processing is required for improving the areal precision of the bonding portion between the sintered body 101 and the substrate 102. Thus, this prior art is not applicable to a substrate of a complex shape. The art shown in FIG. 10 also leaves room for further improvement. First of all, this art requires both a hermetic welding step and a deaeration step, leading to an increase in the required time of the manufacturing process, Also, deformation under high temperatures and high pressures is involved in this prior art, with the result that the hermetically welded portion tends to be broken. Further, this art necessitates a welding technique of a high level and a deformation estimating technique of a high level for the substrate during sintering. In practice, a preliminary test is conducted and the amount of deformation is empirically determined based on the result of the preliminary test. Particularly, where the thickness of the substrate is changed from portion to portion in a complex manner, the amount of deformation is large, with the result that the necessity of the preliminary test is enhanced. What should also be noted is that the prior art shown in FIG. 10 requires a very expensive HIP apparatus of high temperature and high pressure.

SUMMARY OF THE INVENTION

The present invention, which has been achieved in view of the situation described above, is intended to provide a method of covering a substrate surface with a sintered layer of an excellent performance by a simple process and with a low cost.

According to the present invention, there is provided a method of covering a substrate surface with a sintered layer, comprising the steps of:

loading a powdery raw material in a region of forming a sintered layer; and sintering the loaded powdery raw material so as to form a sintered layer covering the substrate surface;

wherein the powdery raw material contains at least two elements and has a temperature region in which a solid phase and a liquid phase are present together, said liquid phase being wettable with the substrate, and said sintering step is performed within the temperature region in which the solid phase and the liquid phase are present together.

The present invention can be employed in various fields. Desirably, the method of the present invention can be employed in the manufacture of cylinders, nozzles and check valves for the injection molding machine, barrels and screws for the biaxial kneading extruder, and nozzles for the extruder.

Figure 1:
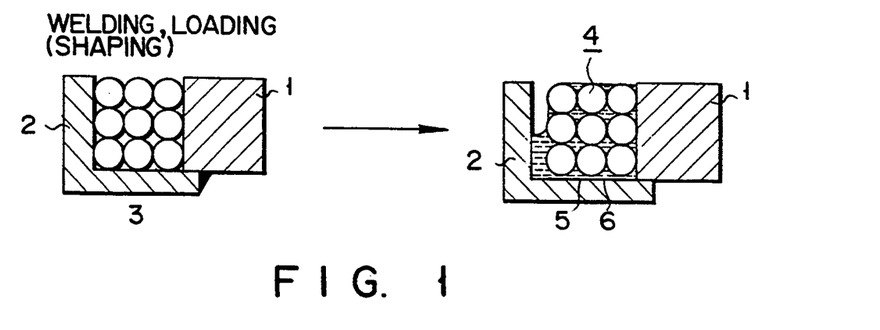
FIG. 1 shows the principle utilized in the method of the present invention.

FIG. 1 shows the principle of the present invention. Before the loading step of a powdery raw material, a substrate 1 and a tool 2 are defatted and washed. Since the stain of the substrate 1 causes reduction in the bonding strength with a sintered layer, the defatting and washing should be carried out carefully. Rust should also be removed in this step.

The loading space of the powdery raw material is formed in the region of forming a sintered layer on the substrate 1 by the welding to the tool 2 or by a mechanical assembling which does not use a tool. Since pressure is not applied to the powdery raw material in the sintering step, the assembling strength may be low. In order to prevent the tool forming the loading space from reacting with or being bonded to the melt of the powdery raw material in the sintering step, thermal spraying of a ceramic material or the like should be applied to the surface of the tool.

A powdery raw material 3 is loaded in the loading space. The raw material 3 should contain at least two elements and should have a temperature region in which a solid phase and a liquid phase are present together, said liquid phase being wettable with the substrate. The raw material 3 should exhibit the properties required for the sintered layer such as a corrosion resistance and an abrasion resistance. It is possible for the powdery raw material 3 to be an alloy consisting of at least two elements or a mixture of a plurality of powdery raw materials. As described above, the powdery raw material should have a temperature region in which a solid phase and a liquid phase are present together. This requirement denotes that, in the case of an alloy, the solidus of the alloy element differs in temperature from the liquidus. In the case of a mixture, at least two element of the mixture should have different melting points in order to enable the mixture to have a temperature region in which a solid phase and a liquid phase are present together.

At least one ceramic material may be contained in the powdery raw material as one of at least two elements or at least one ceramic material may be mixed with the powdery raw material used in the present invention. The mixing amount of the ceramic material, such as metal carbide, metal nitride, metal boride or metal silicide, is about 20% in the case of a hot isostatic pressurizing method. In the present invention, however, it is possible to add 40–50% of a ceramic material. Where a steel material is used as a substrate, it is possible to use, for example, a Ni alloy powder or a Co alloy powder as the powdery raw material in order to obtain a sintered layer exhibiting a corrosion resistance and an abrasion resistance.

The preferred Ni alloy powder has a chemical composition of 9.0 to 18.0% by weight of Cr, 1.7 to 3.9% by weight of B, 2.5 to 4.7% by weight of Si, 0.4 to 5.0% by weight of Fe, the balance of Ni, and unavoidable impurities. The preferred Co alloy powder has a chemical composition of 2.5 to 29.0% by weight of Ni, 17.0 to 22.0% by weight of Cr, 2.8 to 3.8% by weight of B, 1.7 to 4.0% by weight of Si, 1.0% or less by weight of Fe, 4.0 to 7.0% by weight of W, the balance of Co, and unavoidable impurities.

Vibration should be applied during the loading step of the powdery raw material so as to achieve a high loading density. It is desirable to set the loading density at 60% or more. If the loading density is 50% or less, cracking tends to be caused by the shrinkage of the sintered layer.

In the next step, a sintering treatment is applied at a temperature at which a solid phase and a liquid phase of the raw material are present together. Where an alloy is used as the powdery raw material, the sintering treatment should be carried out at a temperature falling between the solidus and the liquidus. In the case of using a mixture, the sintering treatment should be carried out at a temperature higher than the melting point of one element of the mixture and lower than the melting point of another element. If the sintering treatment is carried out at a temperature at which a solid phase alone is present, a sintered layer 4 contains many bores and has a low density. If the sintering treatment is carried out at a temperature at which a liquid phase alone is present, a shrinkage cavity is formed in the final solidifying portion as in the casting.

If the powdery raw material is heated to a temperature at which a solid phase 5 and a liquid phase 6 are present together, the liquid phase 6 exerts an attractive force between the solid particles 5. In this step, the attractive force is not generated between the tool 2 and the solid particles because a thermal spraying of a ceramic material, which is not wetted with the liquid phase, is applied to the surface of the tool 2. On the other hand, the liquid phase 6 is wettable with both the substrate 1 and the solid particles 5, with the result that the liquid phase and the solid particles are moved in the direction of achieving a bonding with the substrate. With progress in the sintering treatment, the liquid phase 6 is generated from within the solid particles 5. As a result, the raw material particles 3 are diminished and the clearance between adjacent particles 3 is filled with the liquid phase 6. Further, the substrate is covered with the resultant sintered layer 4. In the sintering step employed in the present invention, the liquid phase 6 need not be supplied from outside the system.

Figure 11:
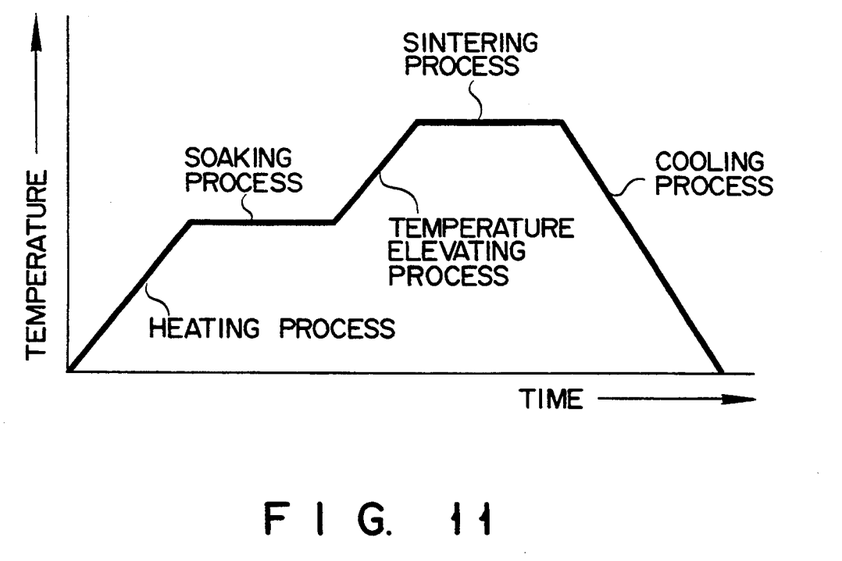
FIG. 11 is a graph showing the preferred sintering cycles of the present invention.

In the sintering cycle from the sintering cycle to the cooling process, it is desirable to employ a two-stage heating, i.e., a cycle including a heating process, a soaking process, a temperature elevating process, a sintering process and a cooling process, as shown in FIG. 11. In a preferred sintering cycle, the heating process is performed at a heating rate of 5° to 10° C./min. In the succeeding soaking process, the temperature is made uniform over the entire product and the sintering is performed. The temperature in the soaking process is set at 20° to 30° C. below the melting point of the powdery raw material. Then, the temperature is elevated at a rate of 0.1 to 5° C./min. in the temperature elevating process. It is necessary to decrease the temperature elevating rate if the product has a complex shape. The temperature in the subsequent sintering process should be determined in a manner to generate a liquid phase sufficient to fill the clearance formed among the powdery particles of the raw material. The sintering temperature depends on the components of the powdery raw material. The sintering process should be started when the entire product has been heated to a predetermined temperature and should be continued for about 20 minutes. Further, it is desirable to employ a furnace cooling in the cooling process.

In the sintering cycle from the heating process to the cooling process, it is desirable to use a sintering furnace free of an oxidizing atmosphere such as a hydrogen furnace or a vacuum furnace. In view of the properties of the sintered layer formed after the sintering process, it is desirable to use a vacuum furnace. In the case of using a vacuum furnace, degassing is performed and, thus, micro-pores are not formed in the resultant sintered layer.

Finally, the substrate covered with the sintered layer is processed into a desired size and shape.

In the present invention, the substrate surface can be covered with a sintered layer by a simple process of sintering the loaded powdery raw material. Pressurizing under high temperatures as in the hot isostatic pressurizing process need not be employed in the present invention, with the result that the substrate and the loading space are deformed little. Deformation takes place mainly in the loaded portion of the powdery raw material, i.e., the sintered layer, in the present invention. In addition, the deformation takes place in mainly the thickness direction of the sintered layer. Thus, the amount of deformation can be easily estimated by calculating the porosity in the loading step of the powdery raw material. It follows that it is possible to form a sintered layer of a uniform thickness with a high dimensional accuracy. Further, a hermetic welding is unnecessary in the present invention. Deaeration and hermetic treatment are also unnecessary. Thus, the welded portion is not broken. Still further, a relatively cheap furnace such as a hydrogen furnace or a vacuum furnace is used in the present invention. Since a hot isostatic pressurizing apparatus is not required, the facility cost is low in the present invention. It should also be noted that the sintering and coupling are performed simultaneously by the attractive force between the liquid phase (melt) generated from the powdery raw material and the remaining solid particles. What should also be noted is that it is possible for the powdery raw material to contain a relatively large amount of a ceramic material, making it possible to form a sintered layer exhibiting a high abrasion resistance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The present invention will now be described with reference to Examples which follow. Of course, the technical scope of the present invention is not restricted by the following Examples.

EXAMPLE 1

Application to a Cylinder for an Injection Molding Machine

Figures 2A, 2B, 2D:
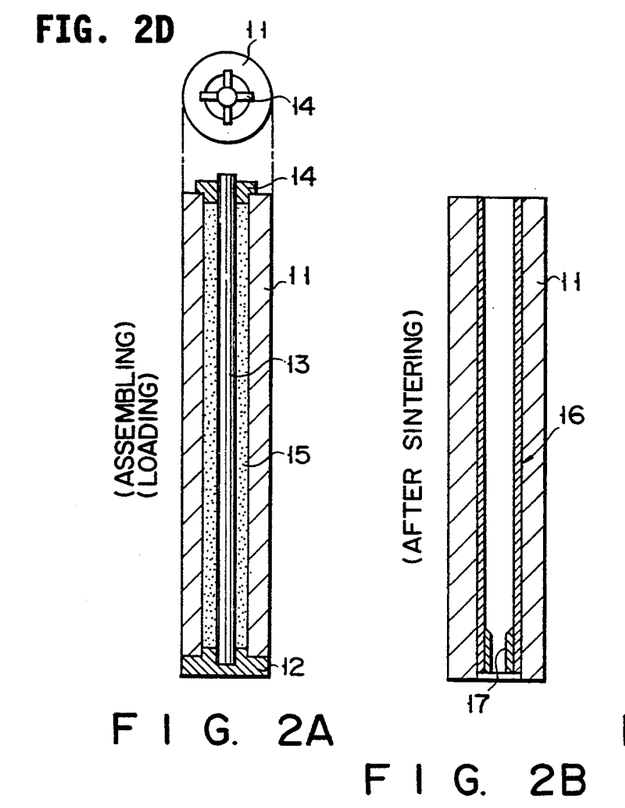
FIG. 2A is a perspective view of an injection molding machine and a substrate having on a surface a raw material powder according to the invention.
FIG. 2B is a perspective view of a substrate having a sintered layer according to the invention.
FIG. 2D is a top view of the injection molding machine and substrate of FIG. 2A.
Figure 2C:
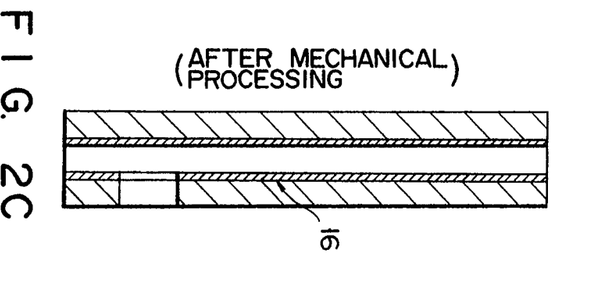
FIG. 2C is a perspective view of a substrate having a sintered layer which was mechanical processed according to the invention.

In this Example, a sintered layer was formed on the inner surface of a substrate 11 used as a cylinder in an injection molding machine, as shown in FIGS. 2A–2C.

In the first step, the inner surface of the substrate 11, which was provided by an SCM pipe having an inner diameter of 20 mm and a length of 630 mm, was defatted. A steel material having a thermal expansion coefficient substantially equal to that of the sintering raw material was selected as the material of the substrate 11 in order to prevent the residual stress between the substrate and the sintered layer. As shown in FIG. 2A, a loading space was formed in contact with the inner surface of the substrate 11 by using a centering tool 12, which was formed of an S25C material having a thermal spraying of alumina applied to the contact region with the sintering raw material powder, a sintering tool 13 formed of an S25C rod (15 mm in diameter and 630 mm in length) having a thermal spraying of alumina applied to the surface, and a spacer 14 formed of an S25C material. The thermal spraying of alumina applied to the surfaces of the centering tool 12 and the sintering tool 13 was intended to cause the sintering material layer to be shrunk in the sintering step toward the substrate. Also, if the melt of the raw material powder is bonded to the tool, it is impossible to remove the tool after formation of the sintered layer. The thermal spraying was also intended to prevent the melt from being bonded to the centering tool and the sintering tool.

An alloy consisting of 10.3% by weight of Cr, 2.1% by weight of B, 2.9% by weight of Si, 0.4% by weight of Fe and the balance of Ni was loaded as a sintering raw material powder 15 in the loading space, as shown in Table 2. The alloy has a ternary eutectic temperature of 980° C., a binary eutectic temperature of 1055° C. and an initial crystallization temperature higher than 1055° C. In other words, both a solid phase and a liquid phase are present together under temperatures ranging between 980° C. and 1055° C. The alloy is suitable for use in the present invention because, if the sintering is performed under temperatures noted above, the sintered layer is not collapsed, leading to formation of a dense sintered layer. Also, the alloy of the particular composition is excellent in corrosion resistance and abrasion resistance, meeting the required performance of a cylinder for an injection molding machine.

A gas atomized powder of 150 μm or less was used as a raw material powder. The raw material powder was loaded into the loading space from the upper end of the assembly shown in FIG. 2A while striking the outer surface of the cylinder with a copper hammer. The loading density was found to be 61%. Then, a sintering treatment was performed under vacuum. In the sintering treatment, the raw material powder was kept at 950° C. for 40 minutes, followed by elevating the temperature to 1025° C at a rate of 4° C./min. Further, the temperature was kept at 1025° C. for 40 minutes, followed by a furnace cooling so as to form a cylindrical sintered layer 16 as shown in FIG. 2B.

The inner diameter of the sintered layer 16 was found to be about 17 mm. Since the raw material powder was loaded to form a cylindrical powdery layer having a thickness of 2.5 mm, the reduction in the thickness of the layer caused by the shrinkage accompanying the sintering treatment was about 1 mm, which was about 40% of the thickness in the loading step, i.e., 2.5 min. A layer 17 resulting from solidification of the liquid phase was formed in the lower portion in a height of about 45 mm. Also, a peeling of a layer was found in the uppermost portion. These layer 17 and the peeling were small enough to be removed by a mechanical processing. Finally, a mechanical processing was applied so as to obtain a desired article, a shown in FIG. 2C.

EXAMPLE 2

Application to a Barrel in a Biaxial Kneading Extruder

Figures 3A, 3C:
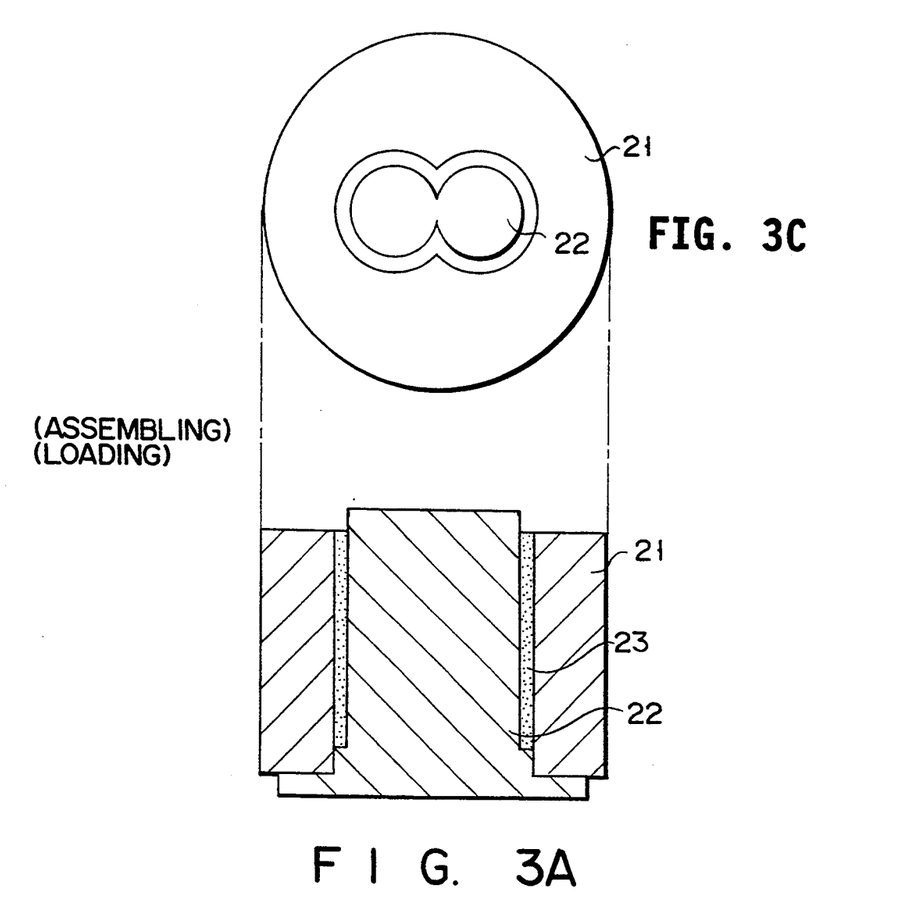
FIG. 3A is a perspective view of a barrel having on a surface a raw material powder according to the invention.
FIG. 3C is a top view of the barrel shown in FIG. 3A.

As shown in FIG. 3, an annular loading space 5.0 mm thick was formed on the inner surface of a substrate 21, i.e., an SCM 440 pipe having an inner diameter of 50 mm, by using a sintering tool 22 having a diameter of 40 mm, which was formed of an S25C material having a thermal spraying of alumina applied to the surface.

Figure 3B:
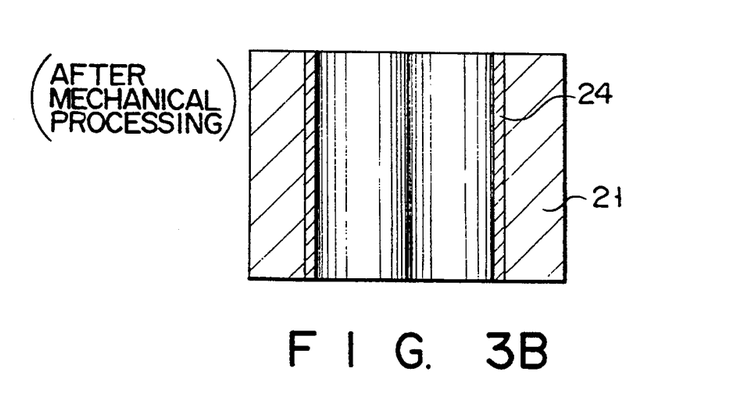
FIG. 3B is perspective view of a barrel having a sintered layer which was mechanical processed according to the invention.

A raw material powder 23 of the composition shown in Table 2 was loaded in the loading space, with a loading density of about 60%, as shown in FIG. 3A. Then, the raw material powder was sintered so as to obtain a sintered layer 24 having a thickness of 3 mm and free of pores. The shrinkage in the thickness of the sintered layer was about 40%. Also, a well region corresponding to the liquid phase was found in the lower portion. Finally, a mechanical processing was applied so as to obtain a barrel for a biaxial kneading extruder, said barrel having an inner diameter of 45 mm and a length of 420 mm, as shown in FIG. 3B. The sintered layer formed on the inner surface of the barrel was found to be 2.5 mm thick.

Figure 8:
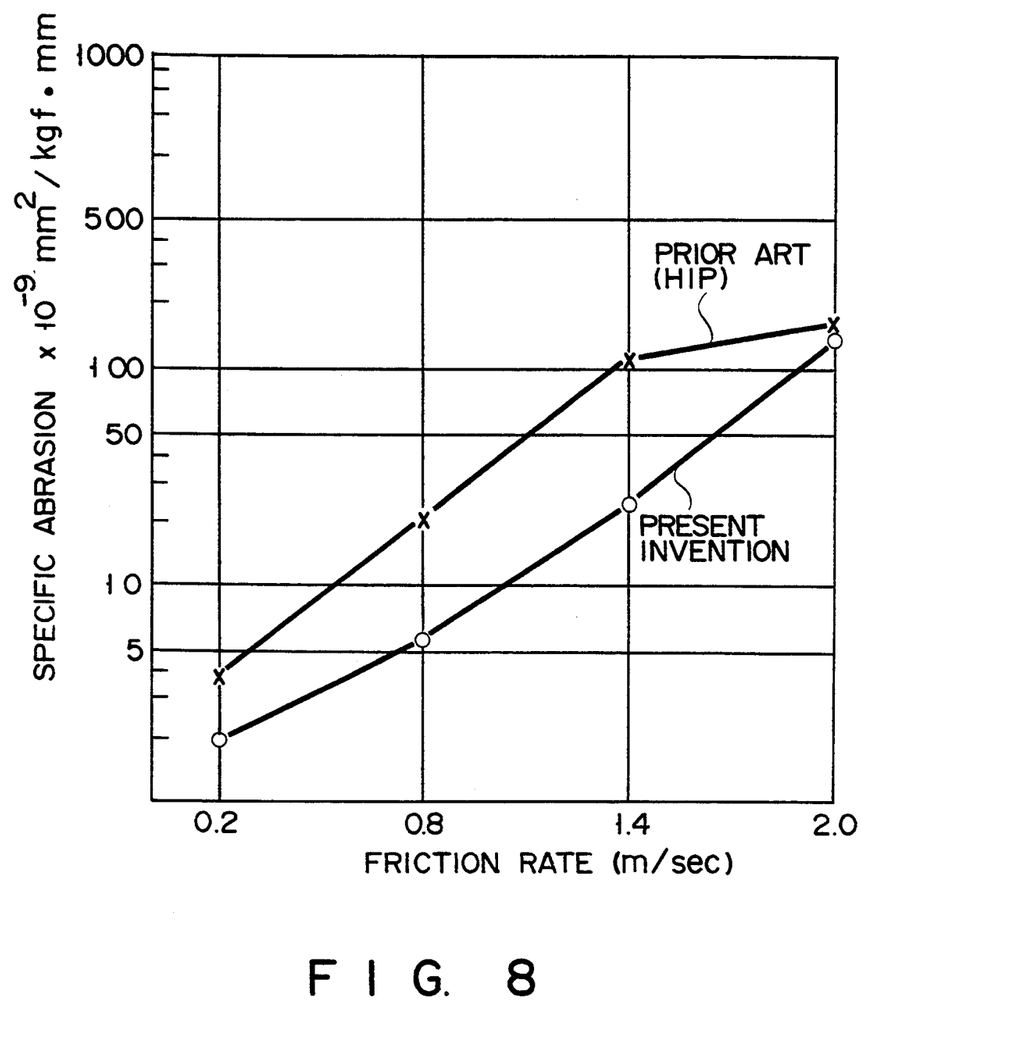
FIG. 8 is a graph showing the abrasion resistance of a sample obtained in Example 2 by using Okosi abrasion test machine and that of a sample manufactured by using a hot isostatic pressurizing apparatus.

An abrasion resistance test (Okosi method) was applied to the resultant sample so as to examine the relationship between the friction rate and the specific abrasion amount. FIG. 8 shows the results together with the results for a sample manufactured by utilizing the hot isostatic pressurizing apparatus. The mating member used in this test was SKD11, HRC58; the final load was 18.9 kg, and the friction distance was 600 m. FIG. 8 clearly shows that the sample manufactured by the method of the present invention exhibits an excellent abrasion resistance.

EXAMPLE 3

Application to a Screw for a Biaxial Kneader

Figures 4A, 4B, 4C, 4D, 4E:
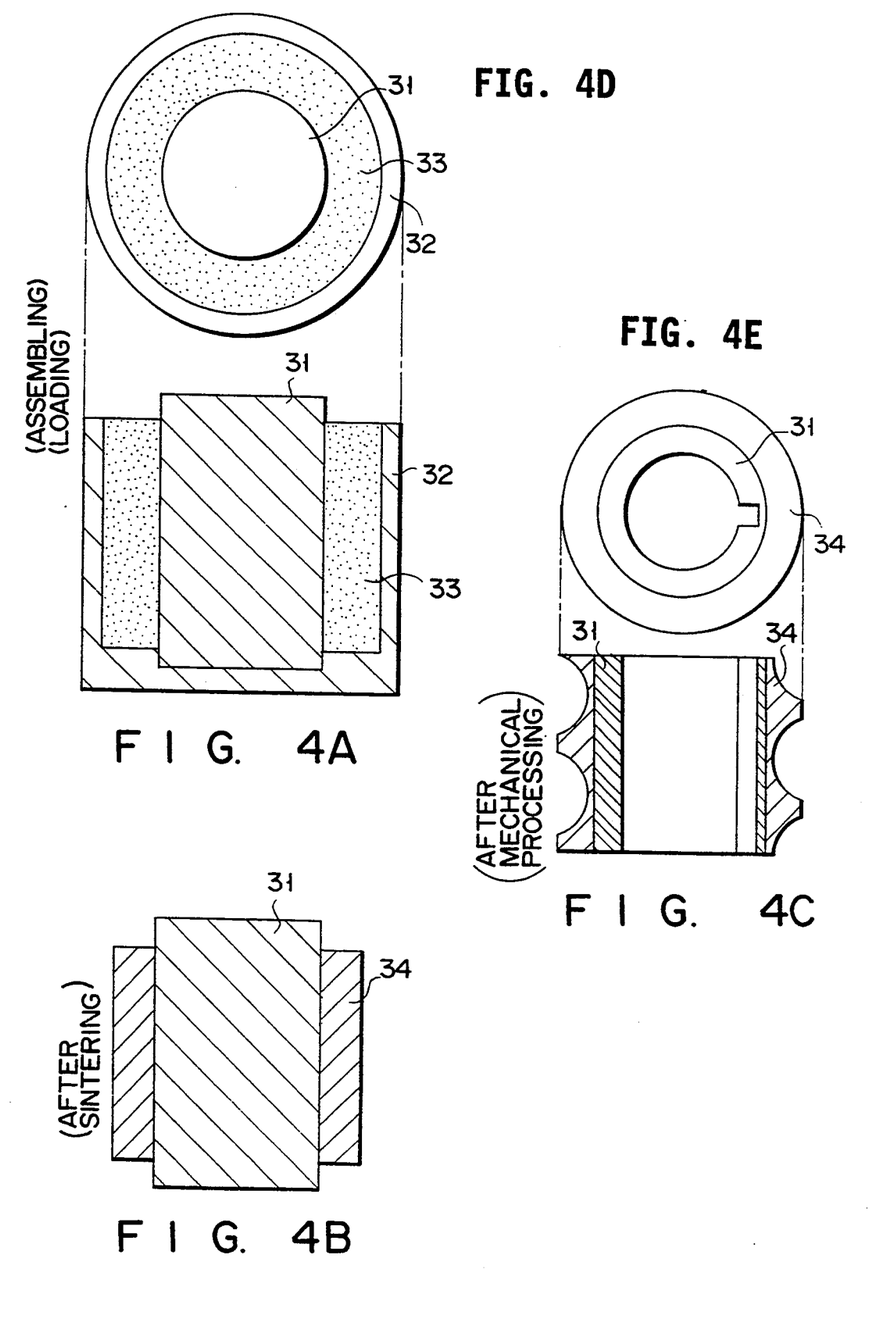
FIG. 4A is a perspective view of a screw having on a surface a raw material powder according to the invention.
FIG. 4B is a screw having a sintered layer according to the invention.
FIG. 4C is a screw having a sintered layer which was mechanical processed according to the invention.
FIG. 4D is a top view of the screw shown in FIG. 4A.
FIG. 4E is a top view of the screw shown in 4C.

A loading space was formed between a substrate 31, i.e., an S35C rod having an outer diameter of 37 mm, and a sintering tool 32, i.e., an S25C cylinder having an inner diameter of 46 mm, provided with a draft, and having a thermal spraying of alumina applied to the surface. A raw material powder 33 of the composition shown in Table 2 was loaded in the loading space, as shown in FIG. 4A. Then, the raw material powder was sintered so as to obtain a sintered layer 34, as shown in FIG. 4B. Finally, a mechanical processing was applied to the sintered layer so as to obtain a screw for a biaxial kneader, said screw having an outer diameter of 44 mm, an inner diameter of 25 mm, and a length of 40 mm, as shown in FIG. 4C.

EXAMPLE 4

Application to a Nozzle for an Injection Molding Machine

Figure 5A:
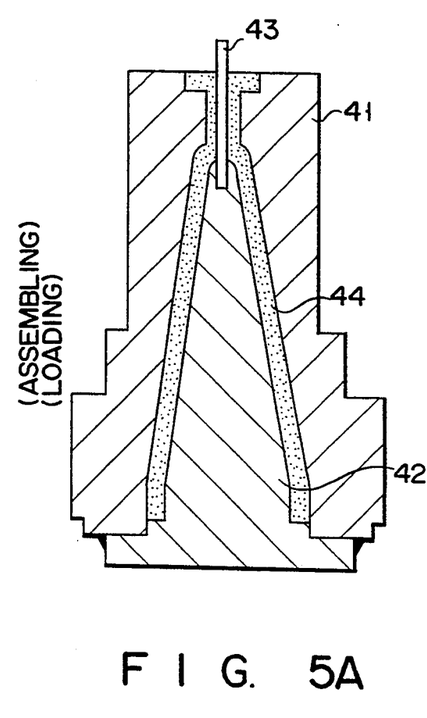
FIG. 5A is a nozzle having on a surface a raw material powder according to the invention.
Figure 5B:
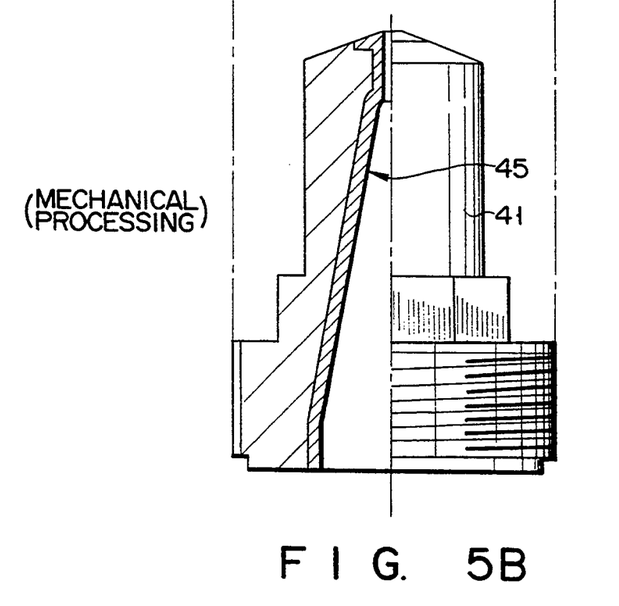
FIG. 5B is a nozzle having a sintered layer which was mechanical processed according to the invention.
Figure 5C:
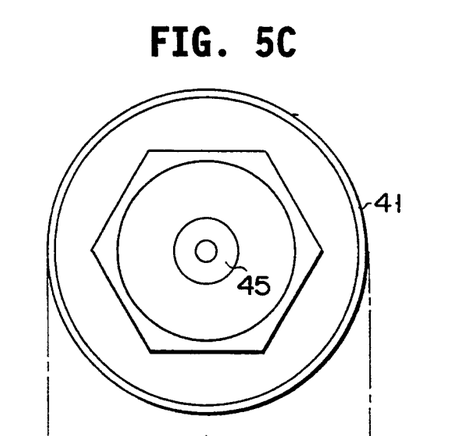
FIG. 5C is a top view of the screw shown in FIG. 5B.

A loading space was formed by using a substrate 41 formed of an SCM440 material, a first sintering tool 42 formed of an S25C material having a thermal spraying of alumina applied to the surface, and a second sintering tool 43, i.e., an alumina pin. A raw material powder 44 shown in Table 2 was loaded in the loading space, as shown in FIG. 5A. Then, the raw material powder was sintered to form a sintered layer 45, followed by applying a mechanical processing so as to obtain a nozzle for an injection molding machine, said nozzle having an outer diameter of 110 mm, and a length of 185 ram, as shown in FIG. 5B.

EXAMPLE 5

Application to a Nozzle for an Extruder

Figure 6A:
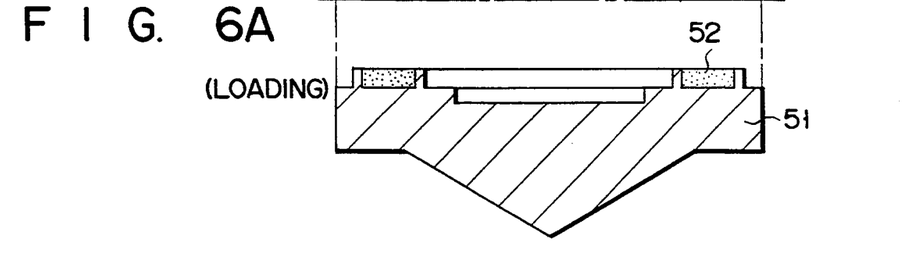
FIG. 6A is a nozzle having on a surface a raw material powder according to the invention.
Figure 6B:
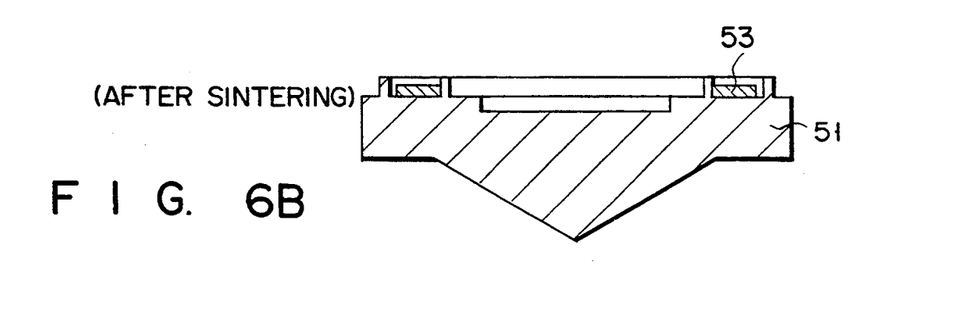
FIG. 6B is a nozzle having a sintered layer according to the invention.
Figure 6C:
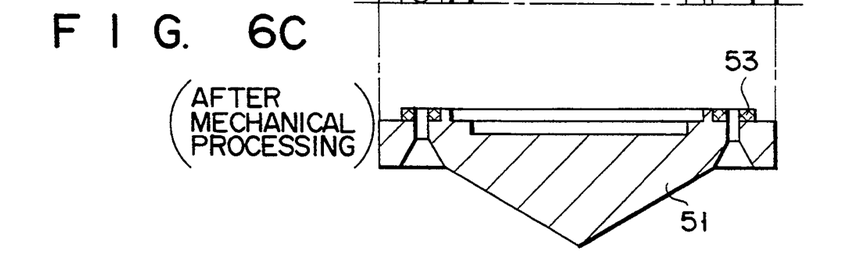
FIG. 6C is a nozzle having a sintered layer which was mechanical processed according to the invention.
Figure 6D:
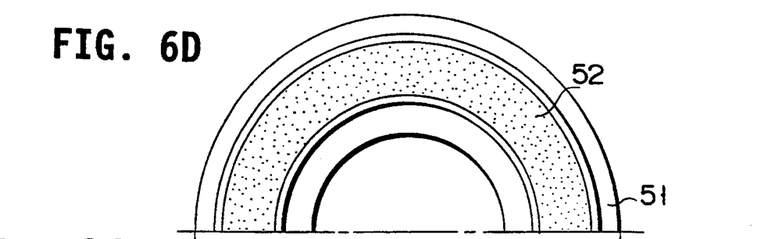
FIG. 6D is a top view of the nozzle shown in FIG. 6A.
Figure 6E:
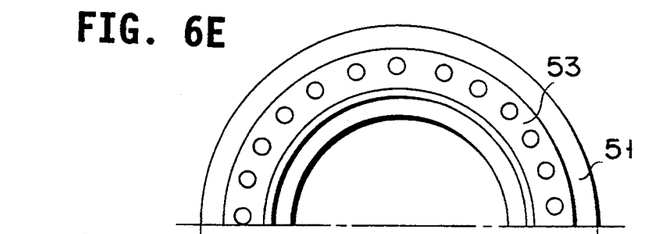
FIG. 6E is a top view of the nozzle shown in FIG. 6C.

A raw material powder 52 shown in Table 2 was loaded in a loading space formed in a substrate 51 consisting of an SCM440 material, as shown in FIG. 6A. Then, the raw material powder was sintered to form a sintered layer 53, as shown in FIG. 6B, followed by applying a mechanical processing so as to obtain an extruder nozzle having a diameter of 420 mm, as shown in FIG. 6C.

EXAMPLE 6

Application to a Check Valve for an Injection Molding Machine

Figure 7A:
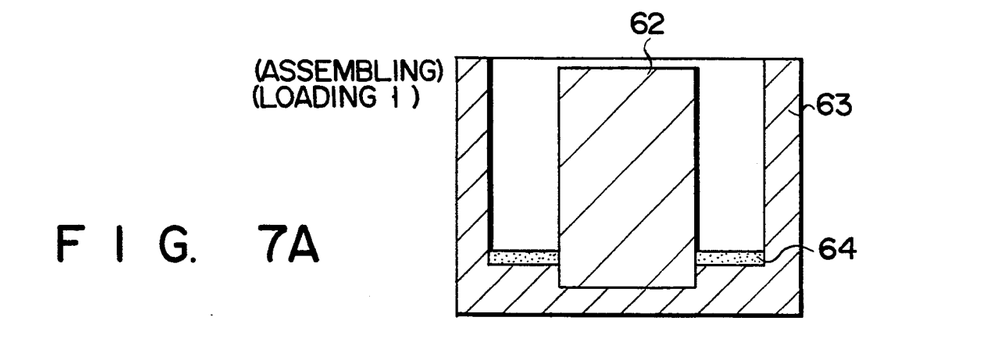
FIG. 7A is a check valve having on a surface a raw material powder according to the invention.
Figure 7B:
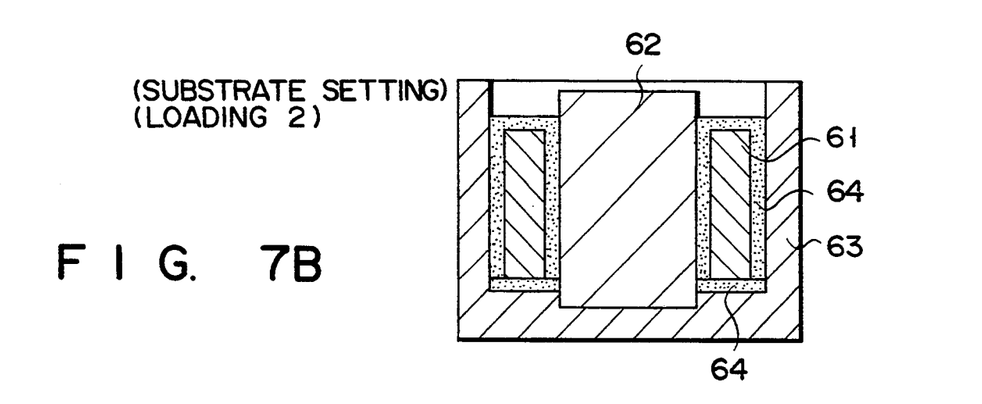
FIG. 7B is the check valve of FIG. 7A having on another surface a raw material powder according to the invention.
Figure 7C:
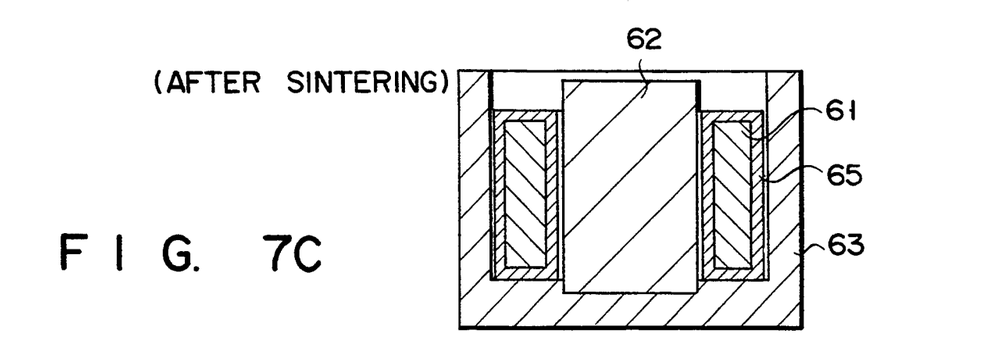
FIG. 7C is a check valve having a sintered layer according to the invention.
Figure 7D:
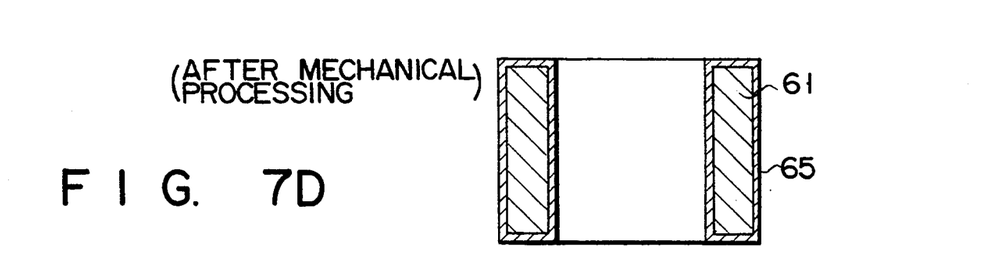
FIG. 7D is a check valve having a sintered layer which was mechanical processed according to the invention.

A raw material powder 64 shown in Table 2 was loaded in a first loading space defined between a first sintering tool 62 formed of an S25C material having a thermal spraying of alumina applied to the surface and a second sintering tool 63 formed of an S25C material having a thermal spraying of alumina applied to the inner surface, as shown in FIG. 7A. Then, a substrate 61 formed of an S25C material was put on the loaded raw material powder, and a second loading space was formed around the substrate 61, followed by loading the raw material powder 64 in the second loading space, as shown in FIG. 7B. Further, the raw material powder was sintered to obtain a sintered layer 65, as shown in FIG. 7C, followed by applying a mechanical processing so as to obtain a check valve having an inner diameter of 25 ram, an outer diameter of 37 mm and a length of 41 mm for an injection molding machine, as shown in FIG. 7D.

The conditions employed in Examples 1 to 6 are shown in Table 1. Also, the compositions of the raw material powders employed in these Examples are shown in Table 2.

SCM440 S25C, SKD11, and S35C described in the above examples correspond 4140, 1025, D2, and 1035 of AISI, and also correspond 42CrMo4, C25, X210Cr12, C35 of DIN, respectively.

As apparent from the Examples described above, the method of the present invention makes it possible to cover the surface of a substrate having a complex shape as in Examples 2, 4 and 6 with a sintered layer performing desired functions, though it was impossible to form such a sintered layer on the substrate surface of a complex shape in the conventional method. In the conventional hot isostatic pressurizing method, it was impossible to form a sintered layer of a high accuracy. In the present invention, however, pressure is not applied during the heating step, making it possible to form such a sintered layer. As a matter of fact, the dimensional accuracy of the inner diameter was ±0.1 and the pitch accuracy was ±0.2 or less even in a large sintered layer as in Example 2, though the liquid phase solidified portion was smaller in diameter by 3.2 mm than the sintered layer because the inner diameter tool was 110 mm in diameter. Since it was possible to apply cutting to the liquid phase solidified portion, a cutting treatment was applied to the entire inner surface of the sintered layer in the final stage.

In the conventional hot isostatic pressurizing method, the loading space of the powdery raw material is hermetically closed, and pressure is applied during the heating step. However, the hermetic closing and pressurizing need not be employed in the present invention. As a result, the excess liquid phase flows downward and can be removed in the mechanical treatment after the sintered layer formation. Also, a large amount of the solid phase in the sintering step remains in the sintered layer covering the substrate surface. The solid phase is superior to the liquid phase solidified portion in both the corrosion resistance and the abrasion resistance. It follows that the sintered layer formed by the method of the present invention is superior in performance to that formed by the conventional hot isostatic pressuring method.

The flow of the liquid phase noted above permits increasing the mixing ratio of the ceramic material in the resultant sintered layer in the case where it is intended to form a sintered layer containing ceramic materials such as carbides as in Examples 5 and 6. The increase in the mixing ratio of the ceramic material permits further improving the abrasion resistance and the corrosion resistance of the sintered layer covering the substrate surface.

What should also be noted is that the method of the present invention is simple in process, does not require a costly equipment, and permits lowering the manufacturing cost of an article including a substrate whose surface is covered with a sintered layer.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

TABLE 1

| Example No. | Article | Substrate | Powdery raw material (see table 2) | Loading thickness (mm) | Thickness after sintering (mm) |
|---|---|---|---|---|---|
| 1 | Cylinder for injection molding machine | SCM440 | Ni alloy 150 μm or less | 2.5 | 1.5 ± 0.2 |
| 2 | Barrel for biaxial kneader | SCM440 | Ni alloy 60 μm or less | 5.0 | 3.0 ± 0.2 |
| 3 | Screw for biaxial kneader | S35C | Co ally 60 μm or less | 12.0 | 7.3 ± 0.3 |
| 4 | Nozzle for injection molding machine | SCM440 | Co ally 60 μm or less | 3.2 | 1.9 ± 0.2 |
| 5 | Extruder nozzle | SCM440 | Ni alloy 60 μm or less plus 40% 10 μm WC powder | 2.5 | 1.5 ± 0.3 |
| 6 | Check valve for injection molding machine | SCM440 | Ni alloy 60 μm or less plus 40% 10 μm WC powder | 2.5 | 1.5 ± 0.2 |

TABLE 1-continued

| Example No. | Article | Substrate | Powdery raw material (see table 2) | Loading thickness (mm) | Thickness after sintering (mm) |
|---|---|---|---|---|---|
| | | | powder | | |

TABLE 1-1

| Example No. | Soaking process | Temperature elevating proces (°C./min) | Sintering process | Sintering atmosphere |
|---|---|---|---|---|
| 1 | 950° C. 40 minutes | 4.0 | 1025° C. 40 minutes | vacuum |
| 2 | 950° C. 80 minute | 1.0 | 1025° C. 60 minutes | " |
| 3 | 1020° C. 30 minutes | 2.0 | 1100° C. 35 minutes | " |
| 4 | 1020° C. 30 minutes | 2.0 | 1100° C. 35 minutes | " |
| 5 | 950° C. 90 minutes | 0.5 | 1025° C. 75 minutes | hydrogen (hydrogen furnace) |
| 6 | 950° C. 20 minutes | 0.2 | 1025° C. 30 minutes | hydrogen (hydrogen furnace) |

TABLE 2

(Composition of Powdery Raw Material, % by weight)

| Example No. | Ni | Cr | B | Si | Fe | W | Co |
|---|---|---|---|---|---|---|---|
| 1 | balance | 10.3 | 2.1 | 2.9 | 0.4 | — | — |
| 2 | balance | 10.0 | 2.2 | 3.2 | 0.5 | — | — |
| 3 | 9.8 | 24.2 | 2.9 | 3.2 | 1.0 | 7.0 | balance |
| 4 | 9.8 | 24.2 | 2.9 | 3.2 | 1.0 | 7.0 | balance |
| 5 | balance | 9.9 | 2.3 | 3.2 | 0.7 | — | — |
| 6 | balance | 9.9 | 2.3 | 3.2 | 0.7 | — | — |

What is claimed is:

1. A method of covering a substrate surface with a sintered layer, comprising the steps of:

loading a powdery raw material onto a region of said substrate to be covered with said sintered layer, said powdery raw material containing at least two elements and having a melting temperature region in which a solid phase and a liquid phase are present together, said liquid phase being wettable with said substrate, and at least one member defines said region of said substrate; and sintering said loaded powdery raw material at a temperature within said melting temperature region in which said solid phase and said liquid phase are present together so as to form said sintered layer covering said substrate surface, wherein said sintering step comprises the steps of:

heating at a rate of 5° to 10° C./min. until a first temperature lower by 20° to 30° C. than said melting temperature region is reached, soaking at said first temperature so as to make said temperature uniform over the entire region of said substrate being sintered, heating at a rate of 0.1° to 5° C./min. until said sintering temperature is reached, sintering at said sintering temperature for about 20 minutes, and furnace cooling.

2. The method according to claim 1, wherein one of said at least two elements is a ceramic material selected from the group consisting of metal carbide, metal nitride, metal boride, metal silicide, and mixture thereof.

3. The method according to claim 2, wherein said powdery raw material contains 40 to 50% by weight of a ceramic material.

4. The method according to claim 1, wherein said substrate is included in the members for defining a loading space of the powdery raw material.

5. The method according to claim 1, wherein the step of loading the powdery raw material includes a process of assembling at least one member and said substrate so as to define a loading space of the powdery raw material.

6. The method according to claim 5, wherein the step of loading the powdery raw material further includes a process of applying a thermal spraying of a ceramic material to that surface of said at least one member which defines the loading space.

7. The method according to claim 1, wherein said powdery raw material includes an alloy powder having a solidus and a liquidus of different temperatures, and said sintering step is performed at a temperature between the solidus and the liquidus of said alloy.

8. The method according to claim 1, wherein said raw material powder includes a mixture of at least two metal elements having different melting points, and said sintering step is performed at a temperature higher than the melting point of one of said at least two metal elements and lower than the melting point of the other metal element.

9. The method according to claim 1, wherein said powdery raw material contains at least one ceramic material.

10. The method according to claim 9, wherein said powdery raw material contains 40 to 50% by weight of a ceramic material.

11. The method according to claim 1, wherein said substrate is formed of an iron-based material and said powdery raw material is selected from the group consisting of a Ni alloy and a Co alloy.

12. The method according to claim 1, wherein said powdery raw material is loaded at a loading density of at least 60%.

13. The method according to claim 1, wherein said heating, said soaking, said elevating, said sintering and said cooling processes are performed under a non-oxidizing atmosphere.

* * * * *